Nov. 18, 1969   E. A. ZADIG   3,478,441
TEACHING AID FOR SELF INSTRUCTION AND TESTING
Filed Dec. 5, 1967
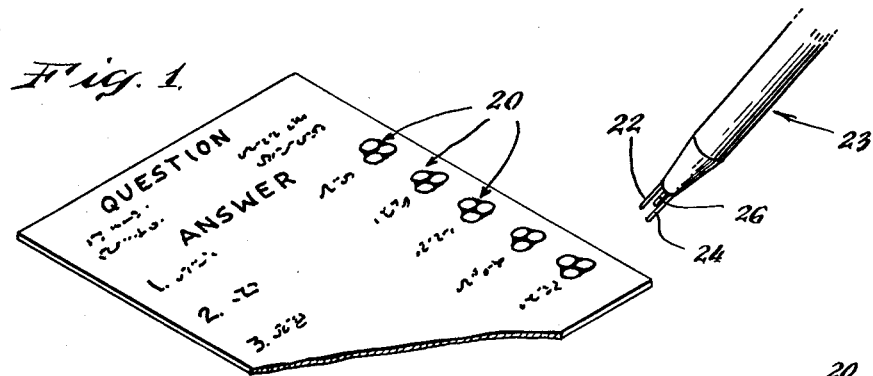
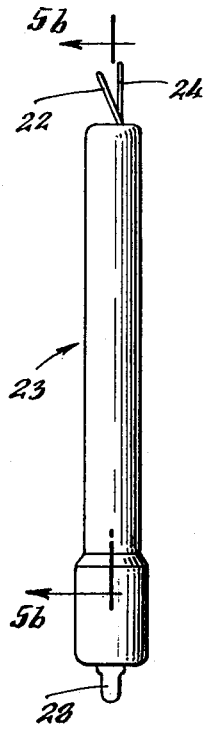
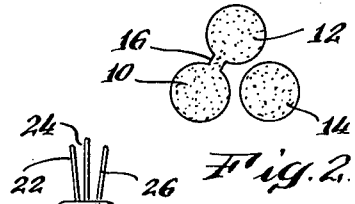
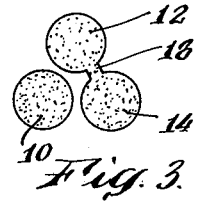
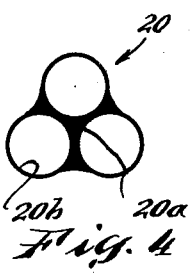
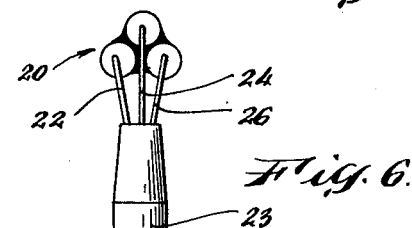
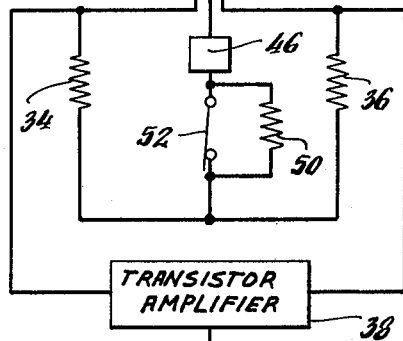
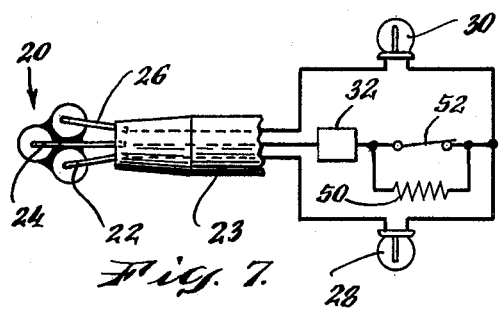
INVENTOR.
Ernest A. Zadig United States Patent Office 3,478,441
Patented Nov. 18, 1969

3,478,441
TEACHING AID FOR SELF INSTRUCTION AND TESTING
Ernest A. Zadig, % The Zadig Patents, P.O. Box 561, South Norwalk, Conn. 06856
Filed Dec. 5, 1967, Ser. No. 688,192
Int. Cl. G09b 7/06
U.S. Cl. 35—9          10 Claims

ABSTRACT OF THE DISCLOSURE

A teaching aid which in one form may be used on a trial and error basis for self-instruction and simply self testing in connection with a question and plural or multiple choice answers, and, in a modified form may be used for testing in a more sophisticated way and scoring by differential counter means. In the first form a stylus with three contact points gives different signals indicating an incorrect selection of answer as well as a correct selection of answer. Optionally, for simple self testing and preventing repeated selection of the same answer, the question sheet comprising a test contact strip for each question may be marked and progressively destroyed as each selection is made. In the second form counting means of known kind may be actuated to keep score, preferably giving a total score which is the aggregate of correct and incorrect answer selections, and optionally the test sheet may also be destroyed progressively as each selection is made.

---

This invention relates to a teaching aid which in one form may be used on a trial and error basis for self-instruction, in connection with a question and plural or multiple choice aswers, and in a modified form may be used as a quizzing means. In the first form the device gives definite different signals indicating an incorrect selection of answer as well as a correct selection of answer, and thus does not leave it open to doubt whether the device is working as would be the case if no signal were given for an incorrect answer. In the second form a test sheet comprising a test contact strip for each question may be "destroyed" progressively as each selection is made, and counting means of known kind may be actuated to keep score, preferably giving a total score which is the aggregate of correct and incorrect answer selections.

Various attempts have been made to provide an economically practical combination of a question and multiple answer sheet and test means such, as a stylus, for indicating which of the suggested answers is correct. These have all been unsatisfactory because of the expense involved in preparing the sheets, and the failure to provide positive indication of incorrect as well as correct answers. The prior art attempts are also unsatisfactory as they have not provided adequate self-testing means capable of detecting and preventing cheating and of preventing misuse of counter means, either intentionally or accidentally.

In carrying out this invention similar contact strips are aligned with each of the plural or multiple choice answers. Each contact strip is long enough to be contacted simultaneously by three contact points of a stylus which is placed on a contact strip in making a selection. In one form the contact strips may comprise one conductive deposit or imprint, preferably an ink imprint, long enough to be contacted simultaneously by two of the contact points of said stylus, and a second deposit or imprint spaced from the first and disposed to be contacted by the third contact point, the third contact point however being inactive but coacting with the first deposit or imprint and an overlay deposit or imprint to form one of said contact strips, all of which look alike on the test sheet, after the space between the deposits or imprints has been masked by this overlay as will be described. In this form at least the longer deposit or imprint is conductive and adapted to complete a circuit through either the first and second contact points of the stylus, or through the second and third contact points of the stylus depending upon the relative positions of the longer and shorter deposits or imprints which is determined by whether the answer associated with a particular contact strip is correct or incorrect.

In the second form each contact strip is similar to the contact strips of the first form except that the longer deposit of the first form is given a narrow intermediate portion, and for ease in description it is said herein that the second form comprises basically three spaced apart deposits or imprints, two of which are of electrically conductive material and are interconnected by a narrow strip of conductive material. It is desirable that the third deposit or imprint be similar in appearance to the other two, and while it is not essential that the third deposit or imprint be conductive it is easier and more satisfactory to make it of the same ink or other material as the interconnected deposit or imprint areas. Thus in both forms of the invention all the basic portions of each contact strip may be applied quickly and easily on the pages of a book, or on separate instruction or test sheets, in a single printing operation, and in a second printing step the space or spaces between deposits or imprints may be filled and masked with non-conductive ink, so that all the contact strips have the same appearance and a student cannot tell from looking at them which is structured to indicate a correct answer and which is differently structured to indicate an incorrect answer.

Each of the contact strips is long enough to permit all three contact points of the stylus to be placed on it simultaneously. Preferably one of the basic deposits or imprints is offset relative to the other or to the other two as the case may be, and one of the three contact points of the stylus is similarly offset so that there is only one possible position in which the stylus can be held in order to have its three points contact a contact strip simultaneously. Thus the stylus cannot be used in upside down position and a "correct" signal cannot be obtained for an incorrect selection and an "incorrect" signal cannot be obtained for a "correct" selection.

For self instruction the contact points may be placed successively on the contact strips respectively which are aligned with the multiple choice answers and the student will learn by being informed in each instance, by different signals, whether a suggested answer is correct or incorrect. For self instruction each suggested answer may be contacted over and over by the same student or by different students using the same instruction sheets or book.

However, if it is desired to conduct a test and accurately rate a student's performance, means are provided so that it will be visually apparent from the test sheet when a selection of one of the suggested answers has been made. Furthermore the response of the contact strips to the stylus may be "destroyed" after being once selected so that it will not be possible to get any signal if the same suggested answer is selected a second time. This is especially important since this "destruction" of the contact strip prevents any message being thereafter given to scoring means associated with the stylus. Accordingly, a student taking a test cannot run up his score by repeatedly selecting a correct answer. The student will also be protected from having his score decreased if inadvertently he should select more than once the same incorrect answer.

In the embodiment of the invention disclosed herein a "correct" signal will be given when a circuit is completed between the contact points 22 and 24 of the stylus, and an "incorrect" signal will be given when a circuit is connected between contact points 24 and 26 of the stylus.

An object of the invention is to provide self teaching means in connection with a question and plural choice answers, including separate means for indicating for each selection of one of the suggested answers whether the selection is correct or incorrect.

A further object of the invention is to provide an improved test stylus.

A further object of the invention is to provide a self teaching means of the kind described comprising electrically conductive areas applied, preferably by printing or silk screening, on separate sheets or on the pages of a book, in association with plural choice answers to a stated question, in combination with a test stylus, in which the said areas and the contact points of the stylus are so arranged that the stylus is not operable in an upside down position.

A further object of the invention is to provide means of the above mentioned kind such that after a suggested answer has been selected that fact will be apparent from the face of the sheet.

A further object of the invention is to provide means of the above mentioned kind including a three point stylus with circuitry for connection to automatic counting means the reliability of which is safeguarded by providing that the student taking the test cannot run up his score by repeatedly selecting a correct answer and also providing that a student will be protected from having his score decreased if he should inadvertently select more than once the same incorrect answer.

The invention will best be understood by reading the following description in connection with the drawings in which:

FIGURE 1 is a perspective view showing a stylus with three contact points in association with a question and multiple choice answer sheet, each of the suggested listed answers having aligned with it a contact strip on which the points of the stylus are placed to determine whether the selected answer is correct or incorrect, FIGURE 2 is a plan view of one form of imprint used in making the contact strips illustrated in FIGURE 1, showing three contact areas, at least two of which (those to the left of the reader) are electrically conductive and are interconnected by a thin strip of conductive material. The two interconnected areas are therefore unitary, FIGURE 3 is a view similar to FIGURE 2 but showing two right hand areas interconnected by a conductive strip, instead of the two left hand areas as shown in FIGURE 2, FIGURE 4 shows an overlay imprint of non-conductive ink masking the lines of separation between the three imprint areas provided by the first printing step illustrated in FIGURES 2 and 3, and providing a frame line around the periphery of a contact strip, FIGURE 5a is a side elevation of a stylus, FIGURE 5b is a sectional view of the stylus of FIGURE 5a showing the circuitry therein, FIGURE 6 is a schematic view showing the three points of a stylus in combination with circuitry adapted for accurate differential counting means whereby the total score of a student taking a test may be quickly and accurately determined, and FIGURE 7 is a schematic view of a modification of FIGURE 5b.

The basic imprint indicated in FIGURE 2 comprises three distinct basic areas 10, 12 and 14, arranged in a clover leaf design and characterized by the fact that areas 10 and 12 are unitary, being interconnected by the narrow conducting strip 16.

The basic imprint shown in FIGURE 3 is similar to that shown in FIGURE 2 except that it is the areas 12 and 14 which are interconnected by the narrow conducting strip 18.

The overlay, masking imprint 20, shown in FIGURE 4, is of non-conductive ink and may be any ordinary ink, and it comprises the Y shaped portion 20a which is disposed to fill the spaces betwen the areas 10, 12 and 14 respectively, and the peripheral framing line 20b.

When it is not desired to "destroy" the contact strip of a selected answer so that it cannot be selected again, it is unnecessary to have two portions of a unitary imprint interconnected by a narrow conductive strip 16 or 18 and the two portions may be combined into a single area equal in length to the two areas 10 and 12 or 12 and 14. However basic imprints of the kind shown in FIGURES 2 and 3 are preferred since they can be employed over and over, without burning out, as will be described and they can also be easily destroyed.

The stylus 23 comprises the three contact points 22, 24 and 26, the contact point 24 being positioned and connected so that when contact points 22 and 24 are bridged a circuit will be completed through a signaling means 28, which may be a lamp of one color, and when the space between contact points 24 and 26 is bridged a circuit will be completed through a different signaling means 30, which may be a lamp of another color. As shown a lead extends from contact point 22 through the signaling means 28 to the signaling means 30 and from the signal means 30 to the contact point 26. A lead from contact point 24 extends through a source of power 32, which may be a simple voltage source such as a flashlight cell, to the lead interconnecting lamps 28 and 30. The lamp bulbs which as shown constitute the signaling means 28 and 30, and are in series with each of the two contact points 22 and 26, limit the current flow to a value so small that the interconnecting conductive strips 16 and 18 are not affected.

By using a larger current flow and providing the resistance 50 shunted around the switch 52, as shown in FIG. 7, the circuit of FIG. 5b may be modified so that it is optional with the user whether or not to burn out the strips 16 and 18.

The circuit shown in FIG. 6 is basically similar to the circuit shown in FIGS. 5b and 7 except that the signaling means 28 and 30 are replaced by the resistors 34 and 36, and a transistor amplifier 38 is connected between said resistors and the contact points 22 and 26 respectively, and the transistor amplifier 38 is in turn connected to a differential counter 40, which may be of known kind. The counter 40, if desired, may be connected to signaling means 42 and 44 respectively, which may be lamps of different color.

The voltage source 46 for the circuit shown in FIG. 6 may be either flashlight cells, or a capacitor discharge. The resistors 34 and 36 are of low value and pass sufficient current to burn out the conductive interconnecting strip 16 or 18 as the case may be. As this burn out occurs the voltage drop across the resistor 34 or 36 triggers the transistor amplifier 38 and actuates the differential counter 40, and also the appropriate signaling means 42 or 44 if they are used. Because the interconnecting strip 16 or 18, as the case may be, has now been destroyed, if the same suggested answer were selected a second time the differential counter would not be actuated and the signaling lamps 42 or 44 would not be actuated.

The burning out of interconnecting strip 16 or 18 leaves a visual mark on the question sheet. This can be useful in several ways. It can be the means for a subsequent check of the test sheet by the teacher. If the student is restricted to making only one selection for each question the visual marking of the question sheet will provide evidence as to whether or not the student has followed this direction.

The visual marking of a test sheet indicating the suggested answer or answers which have been selected can be intensified as for example by providing coloration in the sheet which will cause one color to appear around the test area for correct answer selections and another color to appear for incorrect selections. Such visual markings can be useful without automatic scoring means or they can be obtained by use of the combination of the test strips with the stylus and circuitry shown in FIGURE 6.

In FIGS. 6 and 7 in the lead to the middle contact point 24, a resistance 50 is shown shunted around the switch 52. When switch 52 is closed the device is operative to destroy the connecting strip 16 or 18, as the case may be, for each selected answer. When switch 52 is open the voltage drop is decreased by the resistance 50 so that strip 16 or 18 will not be burned out permitting repeated use of the question and answer sheet.

It is contemplated that in a highly automated form of this invention each of the contact points could end in plugs (not shown) which would be plugged into jacks (not shown) at each pupil's position, and the jacks would be wired to a central counter indicating board or computer (not shown).

There has thus been provided a self teaching or quizzing assembly and system in which the above mentioned objects are accomplished in a simple and practical way.

What I claim is:

1. A teaching or quizzing assembly comprising in combination, a sheet on which appears a question, a plurality of suggested answers one of which is correct, similar appearing contact test strips for each answer, and a test stylus comprising three contact points and two differential signaling means, the test strip associated with a correct answer comprising a conductive deposit long enough and so disposed as to be contacted simultaneously by a plurality of the contact points of the stylus and to complete a circuit between them thus actuating one of said signaling means, and the test strip associated with an incorrect answer comprising a conductive deposit long enough and so disposed to be contacted simultaneously by another combination of the said three contact points of the stylus and to complete a circuit between them thus actuating the other of said signaling means.

2. The assembly claimed in claim 1 in which each test strip comprises at least two separated deposits and the test stylus comprises three contact points disposed so that two of said points contact simultaneously one of said deposits, and the other contact point contacts the other deposit, at least the deposit for contact by two contact points being conductive and constituting a unitary imprint to indicate whether the relative answer is correct or incorrect, one of said signaling means being included in a circuit which is completed between the first and second of said contact points when they are placed on a unitary imprint, and the other signaling means being included in a circuit which is completed between the second and third contact points when they are placed on a unitary imprint, a source of power being included in the lead from the intermediate or second of said contact points, and a circuit being completed through the second contact point and one or the other of the first and third contact points whenever the three contact points are placed on a contact test strip.

3. The assembly claimed in claim 1 in which each contact test strip comprises two portions interconnected by a thin strip of conductive material and the circuit provides a voltage drop sufficient to burn out the strip.

4. The assembly claimed in claim 1 including means for destroying the contact strip of a once selected answer.

5. The assembly claimed in claim 1 including counting means to score a person's selection of answers and means actuable each time a new selection is made to actuate the counting means.

6. The assembly claimed in claim 2 including a nonconductive overlay deposit hiding the area of separation between deposits.

7. The assembly claimed in claim 6 in which the basic deposits of conductive material, which together with the overlay imprint form a complete test strip, comprise portions disposed in staggered relation, and the contact points are disposed in similarly staggered relation and so that all three points can simultaneously contact the test strip only when the stylus is properly positioned and not if the stylus is in upside down or reversed position.

8. The assembly claimed in claim 2 including differential counter means, sensing resistors connected in the leads to the first and second contact points respectively, and a transistor amplifier connected between said resistors and said counter means, the sensing resistors each being of low value adapted to pass sufficient current to destroy a contact strip, the resulting voltage drop across the resistor through which a circuit is completed serving to trigger the transistor amplifier to actuate the said counter means.

9. The assembly claimed in claim 3 in which a switch is provided in the lead to the second or intermediate contact point and a suitable resistance is shunted around the switch providing a choice between being able to use a quiz sheet repeatedly by keeping the said switch open and limiting current with said resistance, or destroying the quiz sheet as each answer is selected by keeping the said switch closed.

10. The assembly claimed in claim 4 including counter means and means for actuating the counter means each time a contact strip is destroyed.

References Cited

UNITED STATES PATENTS

| | | | |
|---|---|---|---|
| 2,724,910 | 11/1955 | Kelly | 35—9 |
| 3,057,082 | 10/1962 | Wellington et al. | 35—9 |
| 3,141,244 | 7/1964 | Smith | 35—9 |

EUGENE R. CAPOZIO, Primary Examiner

W. H. GRIEB, Assistant Examiner